United States Patent
Ruparel

(10) Patent No.: US 11,463,421 B2
(45) Date of Patent: Oct. 4, 2022

(54) METHOD OF GENERATING A SECURE RECORD OF A CONVERSATION

(71) Applicant: RECORD SURE LIMITED, London (GB)

(72) Inventor: Kit Ruparel, London (GB)

(73) Assignee: RECORD SURE LIMITED, London (GB)

( * ) Notice: Subject to any disclaimer, the term of this patent is extended or adjusted under 35 U.S.C. 154(b) by 679 days.

(21) Appl. No.: 16/323,384

(22) PCT Filed: Aug. 8, 2017

(86) PCT No.: PCT/GB2017/052336
§ 371 (c)(1),
(2) Date: Feb. 5, 2019

(87) PCT Pub. No.: WO2018/029464
PCT Pub. Date: Feb. 15, 2018

(65) Prior Publication Data
US 2021/0297395 A1    Sep. 23, 2021

(30) Foreign Application Priority Data
Aug. 8, 2016   (GB) .................................. 1613567

(51) Int. Cl.
*H04L 29/06* (2006.01)
*H04L 9/40* (2022.01)
(Continued)

(52) U.S. Cl.
CPC ...... *H04L 63/0435* (2013.01); *H03M 7/3059* (2013.01); *H04L 9/302* (2013.01); *H04L 9/3236* (2013.01); *H04L 63/30* (2013.01)

(58) Field of Classification Search
CPC ..... H04L 63/0435; H04L 63/30; H04L 9/302; H04L 9/3236; H03M 7/3059
See application file for complete search history.

(56) References Cited

U.S. PATENT DOCUMENTS 6,252,947 B1 *   6/2001   Diamond ................ H04M 3/36
9,270,724 B1 *   2/2016   Morgan ............... H04L 65/4084
(Continued)

FOREIGN PATENT DOCUMENTS

CN        102157175 A   *   8/2011
CN        104954866 A   *   9/2015
(Continued)

OTHER PUBLICATIONS

Shiguo Lian, "Secure service convergence based on scalable media coding," Telecommunication Systems: Modeling, Analysis, Design and Management, Kluwer Academic Publications, BO, vol. 45, No. 1, pp. 21-35 (Nov. 19, 2009) XP019831046.
(Continued)

*Primary Examiner* — Sher A Khan
(74) *Attorney, Agent, or Firm* — Saul Ewing Arnstein & Lehr LLP

(57) ABSTRACT

A method is provided for generating a tamper-proof record of a conversation recorded using a recording device. During or after the recording, successive sections, chunks or other form of fragments of the audio recording are sent continuously or intermittently to a secure remote server. The successive fragments are automatically encrypted and stored securely on the recording device until a network connection is available.

19 Claims, 7 Drawing Sheets

(51) Int. Cl.
*H03M 7/30* (2006.01)
*H04L 9/30* (2006.01)
*H04L 9/32* (2006.01)

(56) References Cited

U.S. PATENT DOCUMENTS

| | | | | |
|---|---|---|---|---|
| 9,305,551 | B1* | 4/2016 | Johns | G16H 10/60 |
| 2001/0036271 | A1* | 11/2001 | Javed | H04N 21/2743 |
| | | | | 380/217 |
| 2002/0078361 | A1* | 6/2002 | Giroux | H04L 63/0428 |
| | | | | 713/183 |
| 2002/0110251 | A1* | 8/2002 | Hori | H04S 1/00 |
| | | | | 381/104 |
| 2002/0150239 | A1* | 10/2002 | Carny | H04L 9/14 |
| | | | | 380/37 |
| 2003/0079222 | A1* | 4/2003 | Boykin | H04N 21/235 |
| | | | | 725/135 |
| 2003/0185107 | A1* | 10/2003 | Goodman | H04H 60/13 |
| | | | | 369/2 |
| 2005/0227218 | A1* | 10/2005 | Mehta | G09B 5/00 |
| | | | | 434/350 |
| 2006/0268792 | A1* | 11/2006 | Belcea | H04L 47/12 |
| | | | | 370/338 |
| 2006/0291798 | A1* | 12/2006 | Suneya | H04N 9/8042 |
| 2007/0042758 | A1* | 2/2007 | Bozzone | H04M 1/2474 |
| | | | | 455/413 |
| 2008/0263363 | A1* | 10/2008 | Jueneman | H04W 12/06 |
| | | | | 713/184 |
| 2009/0002476 | A1* | 1/2009 | Cutler | H04N 7/142 |
| | | | | 348/14.01 |
| 2009/0327703 | A1* | 12/2009 | Feudo | H04L 9/321 |
| | | | | 713/168 |
| 2013/0243186 | A1* | 9/2013 | Poston, Jr. | G06F 3/165 |
| | | | | 380/28 |
| 2013/0291082 | A1* | 10/2013 | Giladi | H04L 63/08 |
| | | | | 726/7 |
| 2014/0140497 | A1* | 5/2014 | Ripa | H04M 3/5133 |
| | | | | 379/265.06 |

FOREIGN PATENT DOCUMENTS

| | | | | |
|---|---|---|---|---|
| CN | 105450675 A | * | 3/2016 | H04L 65/601 |
| CN | 106209860 A | * | 12/2016 | H04L 65/601 |
| GB | 2 513 376 A | | 10/2014 | |
| WO | WO-2018029464 A1 | * | 2/2018 | H03M 7/3059 |

OTHER PUBLICATIONS

Luc Bouganim et al., "Dynamic access-control policies on XML encrypted data," ACM Transactions on Information and System Security, ACM, New York NY, vol. 10, No. 4, pp. 1-37 (Jan. 22, 2009) XP058289897.

International Search Report, dated May 12, 2017, issued in International Application No. PCT/GB2017/052336.

* cited by examiner

FIGURE 3

METHOD OF GENERATING A SECURE RECORD OF A CONVERSATION

CROSS REFERENCE TO RELATED APPLICATIONS

This application claims the priority of PCT/GB2017/052336, filed on Aug. 8, 2017, which claims priority to GB Application No. GB1613567.5, filed on Aug. 8, 2016, the entire contents of each of which being fully incorporated herein by reference.

BACKGROUND OF THE INVENTION

1. Field of the Invention

The field of the invention relates to a method for secure recording and storage of a conversation, and to related systems and apparatus. The recording can be an audio recording, or a video recoding, or a recording of any other sequence of sound or images, such as desktop capture, screen-shares, and any form of streaming media.

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

2. Technical Background

Consumers are demanding for more transparency in the firms they choose to trust. Within financial services sectors, customers expect more flexible, transparent and secure services. It is crucial to securely record all form of spoken conversations between front-line staff and customers to ensure they can be authoritatively capture in order to enable further analysis and retrieval.

Existing systems often record audio on a device which is directly connected to a tamper-proof storage. An audio recording may also be streamed directly from a client device to a server, where it is then encrypted. Often the same encryption key is used for one audio recording. Hence it may be possible to have access to the whole audio recording if the encryption key is hacked.

There is an acute need for a robust, secure method of recording spoken conversation to reduce the risk of fraud.

3. Discussion of Related Art

The prior art of capturing an audio file and storing it onto a tamper proof device is broad. Reference may be made to JP2016516346A, CN104468061A, CN103685162A, GB2513376A, U.S. Pat. No. 7,386,872B2, JP04218256B2, U.S. Pat. No. 8,473,585, CN104994069A.

GB2513376A for example discloses a cloud storage method for storing information in a distributed data processing environment. The information is split and encrypted into blocks before being uploaded to a server.

U.S. Pat. No. 8,473,585 for example discloses a method for uploading data using multi-threaded optimization by storage management. The data is uploaded in the form of chunks at a server and the chunks are encrypted at the server before storage.

CN104994069 for example discloses a data integrity verification method so that data on the cloud server would not get repeated. The data is divided into blocks and gets encrypted before upload to the server.

SUMMARY OF THE INVENTION

The invention is a method of generating a secure record of a conversation, comprising the steps of:
(a) recording the conversation using a recording device;
(b) creating a section, chunk or other form of fragment of the conversation at the device;
(c) uniquely encrypting that fragment, and also uniquely encrypting subsequent fragments, at the device so that decryption of any single fragment does not result in the entire record of the conversation being decrypted.

If, through brute-force decryption techniques, one fragment or section is successfully decrypted on the client recording device, the decryption algorithm discovered cannot be used to decrypt other fragments/sections. (We will use the terms 'fragment' and 'section' interchangeably).

Optional features include one or more of the following:
each encrypted fragment is sent to a remote server whilst the conversation is continuing. Because audio etc. fragments are transmitted to the server whilst recording is still going on, therefore the time between completion of the recording until the entire recording being available at the server is much shorter than if transmission did not start until after the entire audio etc. record had been completed.
each encrypted fragment is locally stored on the device whilst the conversation is continuing and is also locally stored on the device whilst the conversation is continuing.
the method includes the further steps of (a) retrieving from a remote secure server the conversation or a fragment of the conversation; (b) decrypting the conversation or fragment(s) and (c) an end-user determining if the decrypted conversation or fragment(s) are compliant with regulatory requirements or other laws.
each encrypted fragment is sent to a remote server and is also locally stored on the device until such time as the device receives from the server a notification that a specific encrypted fragment has been successfully received and stored at the server, at which time the device deletes that locally stored encrypted fragment. Assuming network connectivity is normally available between client and server, less storage space is required on the local client device.
each encrypted fragment is sent to a remote server whilst the conversation is continuing and is also locally stored on the device until such time as the device receives from the server a notification that all of the fragments making up the entire conversation have been successfully received and stored at the server, at which time the device deletes all of those locally stored encrypted fragments. This has the advantage of increased resilience, in that at any time after recording is completed, the entire audio record exists either wholly stored on the client recording device, in its encrypted, fragmented form, or confirmed stored on the server device prior to recording deletion—ensuring that if any individual fragment is lost or corrupted during or after transmission, then this will be automatically resent and will not compromise the overall integrity of the recording, upload and storage process.
if the server identifies any fragments as missing or corrupt, then it requests the device to re-send these.

each encrypted fragment is sent to a remote server continuously or intermittently whilst the conversation is continuing each encrypted fragment is sent to a remote server continuously or intermittently after the conversation is concluded.

the device:
- (a) buffers in memory the output of a microphone that is recording the conversation;
- (b) compresses using a lossy or lossless compression algorithm each section, chunk or other form of fragment of the conversation;
- (c) uniquely encrypts each fragment;
- (d) creates a header for the entire record of the conversation, the entire record being made up of a set of uniquely encrypted fragments;
- (e) uploads one or more encrypted fragments and/or the header if network connectivity is available.

each fragment is automatically encrypted with a different encryption key.

a unique initialisation vector and symmetric key are generated for each fragment, and the initialization vector and symmetric key are used to encrypt each fragment.

a hash is generated for the successive fragments as a checksum for the original unencrypted successive fragments.

the memory size of each fragment is chosen for efficient transmission over a network and for reducing the risk of fraud.

the server generates a unique user encryption key for the user/recording device pairing when the user first registers its device.

the symmetric key is encrypted using the user encryption key and an RSA algorithm.

the encrypted fragments are stored locally in the recording device creating a queue of encrypted files.

the encrypted fragments are stored alongside metadata containing details of each fragment.

metadata contains one or more of the following: time stamp, file type, number of fragments, start time, end time, AGC (Automatic Gain Control) settings, user ID, device ID.

the fragments are transmitted to a remote server whenever a network/internet connection is established.

the queued fragments are transmitted to the remote server even if the recording is not complete.

the server receives the encrypted fragments alongside their metadata, decrypts them using their unique encryption key and stores them into a secure transactional vault.

the server aggregates each fragments and their metadata into a unique conversation record and stores the unique conversation record into a unique permanent vault dedicated to the user.

the server waits for all the fragments to be received in a specific reasonable time before storing them into the permanent vault.

an alert is raised on the recording device and/or on the server if all the fragments are not received within a specific reasonable time.

the server sends an acknowledgement receipt to the recording device that all the fragments are received, and the fragments are deleted on the recording device when the recording device receives the acknowledgement receipt.

the server sends an acknowledgment receipt to the recording device once a fragment is received, and the received fragment is deleted on the recording device when the recording device receives the acknowledgement receipt.

the user of the recording device is able to track or get notification on the status of the conversation recording.

the server is able to track or get notification on the status of the conversation recording.

the user is allowed to pause uploading activities for a configured maximum duration to converse network bandwidth.

the recording device only sends the fragments to a remote server if connected to LAN or WiFi to avoid data charges over a cellular network.

the recording device only sends the fragments to a remote server at specific date and times.

the conversation is immediately retrievable and accessible by an authorised end-user once it has been uploaded on a remote server.

AGC (Automatic Gain Control) data is captured at recording time in order to detect the status of a recording settings, so that potential AGC problems can be reproduced or emulated and debugged.

a server-side speech and language analytics engine processes the conversation recording.

a client or device-side speech and language analytics engine processes the conversation recording to, for example, detect silence, noise, reverberation, poor microphone positioning and uploads this as metadata to a remote server.

Other aspects of the invention (which may also include any of the optional features listed above) include the following:

A system for generating a tamper-proof record of a conversation, the system comprising: a recording device for recording the conversation and for, during or after the recording, continuously or intermittently sending successive sections, chunks or other form of fragments of the audio recording to a secure remote server, and a secure remote server for receiving the successive fragments of the audio, a secure vault for storing the successive fragments of the audio.

A recording device that implements the method as defined above.

BRIEF DESCRIPTION OF THE FIGURES

Aspects of the invention will now be described, by way of example(s), with reference to the following Figures, which each show features of the invention as implemented in a system called RecordSure:

FIG. 3 is an example of a screenshot of a web-facing portal in which an advisor may log into to make a recording.

DETAILED DESCRIPTION

Figure 1:
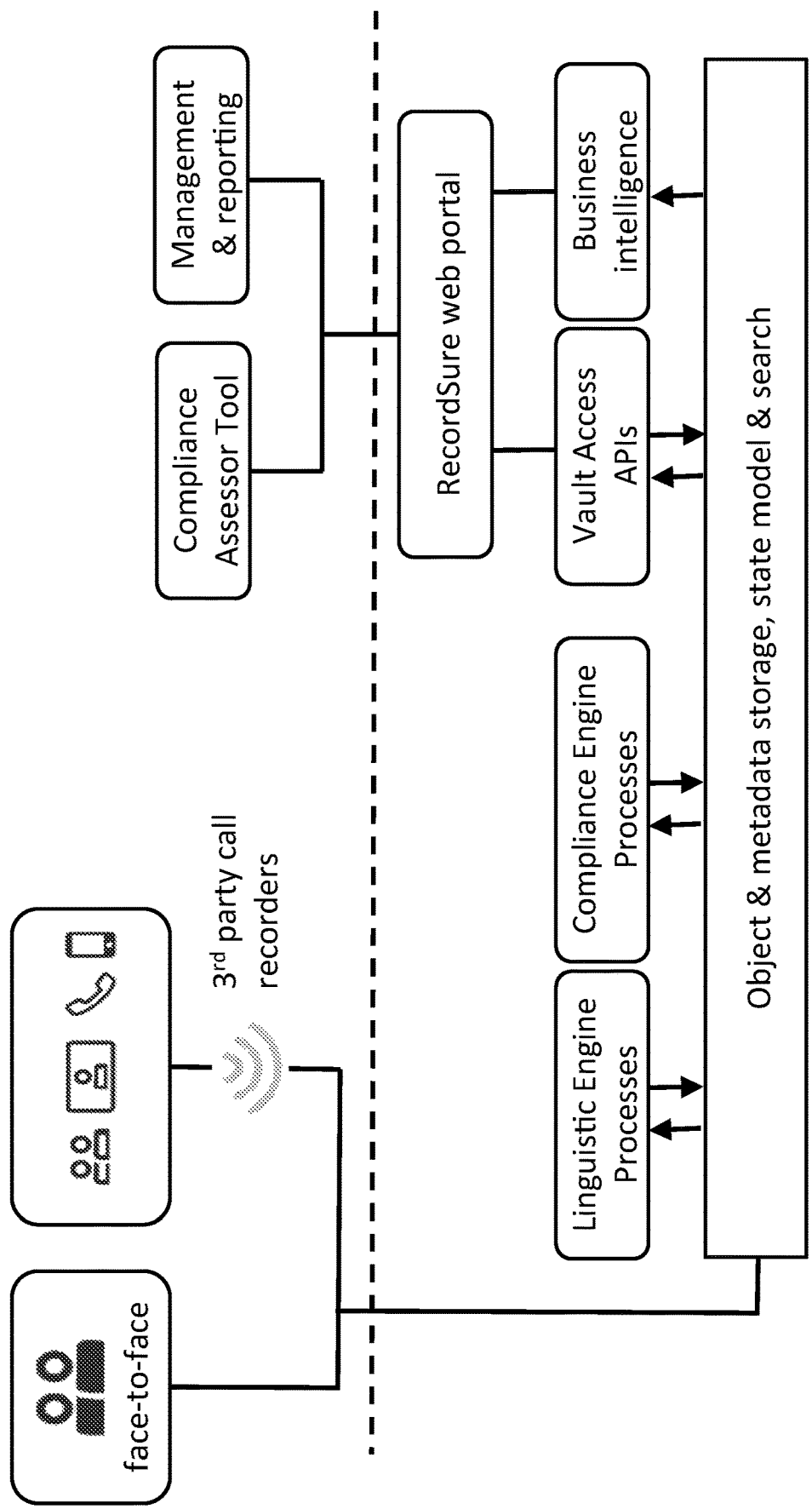
FIG. 1 is a high level diagram of RecordSure technology.

RecordSure provides a unique audio capture solution for recording face-to-face recordings between financial advisers and their clients in a manner that is compliant with regulatory requirements as well as with data protection legislation or other laws.

In order to capture face-to-face conversations in branches, meeting rooms and in the field, a robust in-person recording technology has been developed; it uses advanced microphone technology and proprietary algorithms to capture high-quality 'wideband' audio, and it securely stores-and-forwards recordings made in the field even when no Internet or other data connection is available.

The method presented captures audio conversation on PCs and/or mobile devices in a manner that reduces the risk of fraud, accidental corruption and/or data-loss, in the capture and transmission to a secure audio vault. In addition, transparency with customers is improved as the customer can be assured there is a recording of the conversation that can be supplied to them in the event of query or complaint.

The method further provides critical conversation storage, retention and access features and supports the highest quality audio to the standard that any additional upstream packages would require.

This approach makes several important contributions, such as, but not limited to:
- providing a reliable and secure way to send an audio recording off a device on which it is recorded;
- performing a standard handshake protocol to guarantee that the entire audio recording is fragmented into multiple chunks or fragments;
- guaranteeing that the entire audio conversation goes through to a data storage vault and that it cannot be tampered with in the meantime (provided that there was at some point an internet connection);
- providing a unique encryption key per chunk or fragment (each recording is split into chunks or fragments), as opposed to per recording, hence reducing the risk of fraud;
- recording conversations alongside their metadata, allowing easy search and retrieval of records;
- storing conversations alongisde their metadata and any other telephony-based communications;
- recording conversations whether or not the recording device is currently connected to a company network or Internet;
- enabling customers to have access to their own recordings;
- fragmenting the audio recording into a plurality of fragments during the recording process;
- storing a complete audio recording in the form of multiple fragments/chunks instead of storing a single file per audio recording;
- storing encrypted fragments on the recording device until a network connection is available and then uploading the fragments to a secure remote server;
- receiving an encryption key for pairing from the server;
- automatically encrypting conversation recordings and transferring them from the recording device to a secure Vault whenever an Internet connection is established, where they are then available for playback via a secure portal;
- a background service on the recording device continuously checking for the availability of the network;
- the server aggregating all files to form a whole or complete recording;
- the server deleting files from a temporary location after recording aggregation;
- sending an acknowledgement to the device upon successful aggregation of recording files and temporary location sanitization;
- sending the user a notification about the status of uploaded/completed recordings;

Examples of business benefits are:
- greater insight into first line sales activity;
- greater adviser/employee efficiency;
- training alignment to sales weaknesses;
- more efficient complaint handling,
- improved customer transparency;
- authentic records for evidence purposes;
- removal of mystery shopping;
- improved record keeping and customer relationship management;
- improved management information for senior management;
- improved systems and controls;
- reduction in supervision visits.

FIG. 1 is a highlevel diagram of the RecordSure technology. RecordSure records face-to-face conversations or any other form of spoken conversation. A speech and language analytics engine as well as a compliance engine processes the conversation recordings and extracts meaningful information from the conversation recordings and analyses them for compliance. The recorded conversations are securely stored in adherence to BS10008 and ISO 27001 standards, linking to Customer Relationship Management or other lines of business systems. The recordings can then easily be found and retrieved through a comprehensive search facility based on metadata. Hence, in the event of a complaint, additional protection can be given by providing evidence (in the form of an accurate recording). An audio or AV record is the only authoritative record of what has occurred during a conversation. Meeting notes, forms and similar methods of documentation cannot be relied upon to be 100 percent accurate. In addition to providing businesses with verifiable evidence, the recording can also be made available to the end consumer. The technology also enables an access to a compliance tool and a number of management and reporting tools via a web portal.

Additional RecordSure packages are configured to the needs of specific business organisations and, using advanced artificial intelligence technology, are taught about captured recordings, so that the right information, analytics and benefits for a specific business are given.

Figure 2:
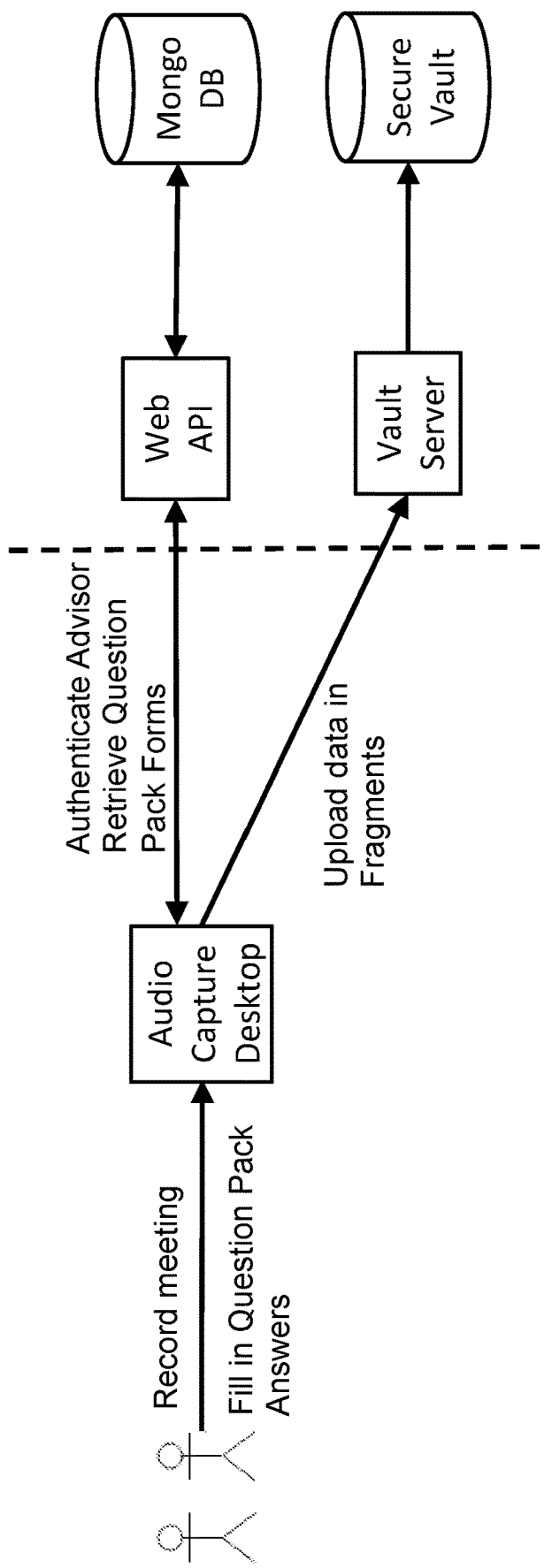
FIG. 2 shows an overview of the systems and software involved in the client application that records and uploads audio plus audio metadata and questionnaire results.

FIG. 2 shows an overview of the systems and software involved in the client application that records and uploads audio plus audio metadata and questionnaire results.

These include:
Audio Capture (record, encrypt, fragment);
Web portal and admin services API (login/authenticate);
Vault Server (upload, decryption);
Record Fragments Aggregator (aggregate, store).

The method ensures that all forms of spoken conversation relating to a financial transaction can be authoritatively captured for automated analysis and retrieval.

The vault has been designed in accordance with BS 10008 "Evidential Weight and Legal Admissibility of Electronic Information"—the standard recognised by financial regulators that outlines best practice for the management and storage of electronic data records. The vault stores and associates audio conversations and other media, such as forms, agent scripts, documents, email and SMS extracts for their required retention period, and guarantees their authenticity and accessibility at the point they need to be reproduced.

If an organisation has already invested in long-term online storage for records, the system is also able to integrate and leverage the client's existing SAN, grid or object storage within the RecordSure vault.

Figure 3:
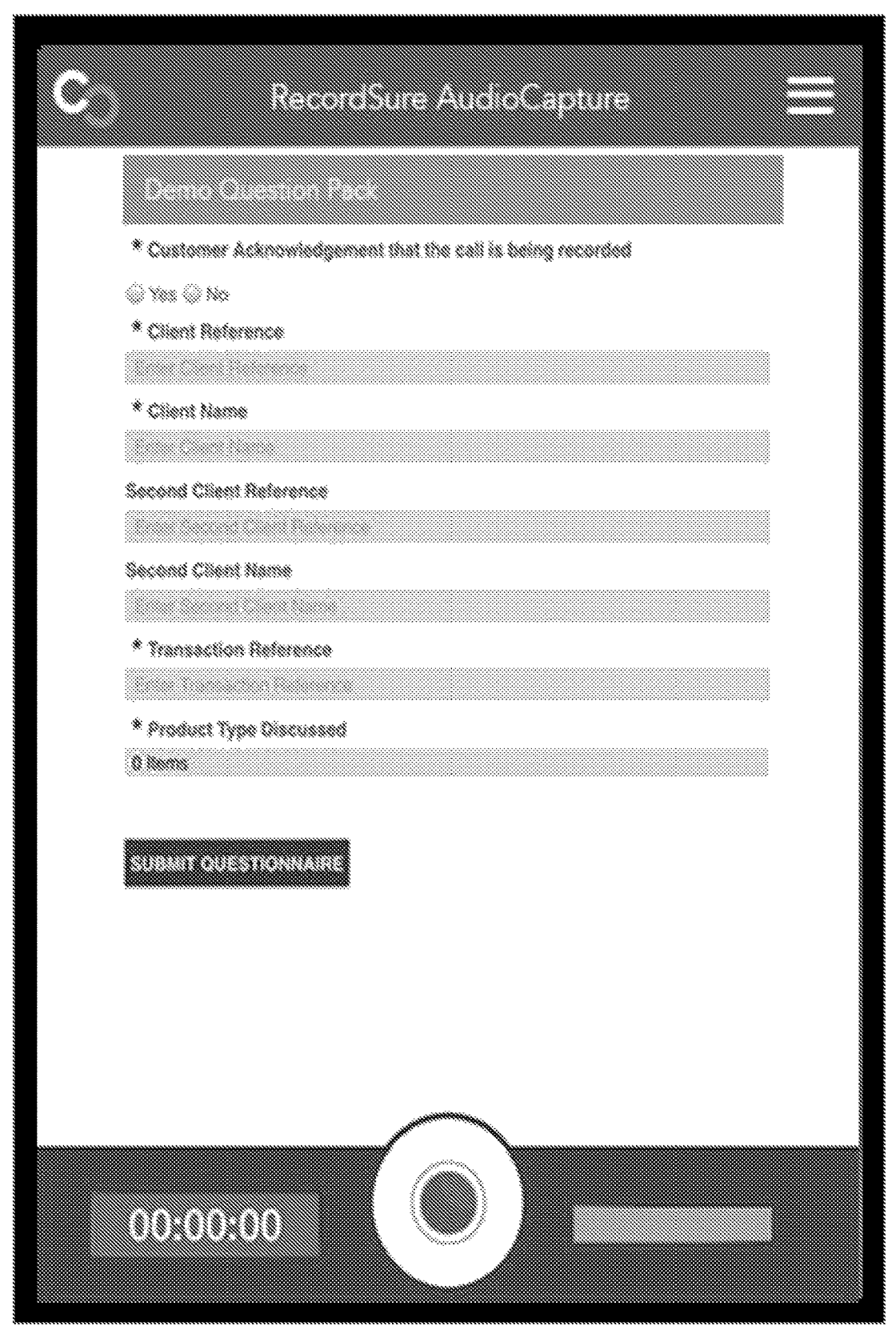

FIG. 3 is an example of a screenshot of a user interface of the recording device where a user may make a recording and provide metadata. An advisor may first ask the customer to acknowledge that the call is being recorded. The authenticated user may enter for example a reference and name for the client, a transaction reference and the product type discussed. The authenticated user may also submit a questionnaire.

Figure 4:
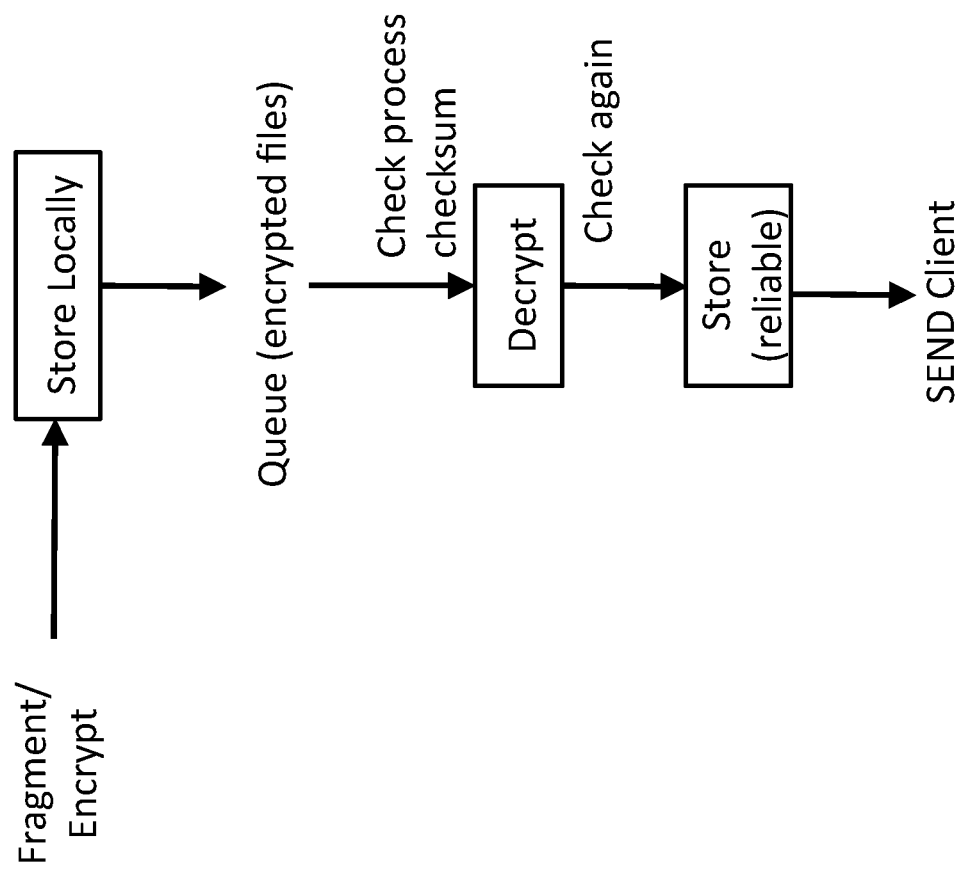
FIG. 4 shows a high-level upload and storage workflow diagram of audio capture.

FIG. 4 shows a diagram with the high-level concepts of audio capture. During a conversation recording, each audio file, as it is buffered in memory, is chunked into small pieces, called fragments, more suitable for network transmission. Each fragment is automatically encrypted with a unique encryption key and stored locally, therefore creating a queue of encrypted files. For each fragment, a hash is also generated as a checksum for the original fragment. Once an Internet connection is available, the fragments are decrypted after verification of their checksum. The server then combines the fragments back into one unique conversation record, which is then encrypted again and stored into one or multiple secure locations. The server finally sends an acknowledgment to the client-recording device.

Encryption:

The encryption is based on a unique public/private key pair generated by the server for each user when they first register their client-device software with the server. For each fragment a unique initialisation vector (IV) is generated, and then a 128-bit AES encryption key, both of which are used to uniquely encrypt each fragment. The AES key is then encrypted using the user's public key, using an RSA algorithm. A unique hash of the unencrypted source data is generated as a checksum for the original audio fragment using an SHA algorithm. Each of the RSA encrypted AES key, the IV, the AES encrypted fragment and the checksum hash are then stored on the device, and queued for upload to the datacentre over SSH using an EV certificate.

Figure 5:
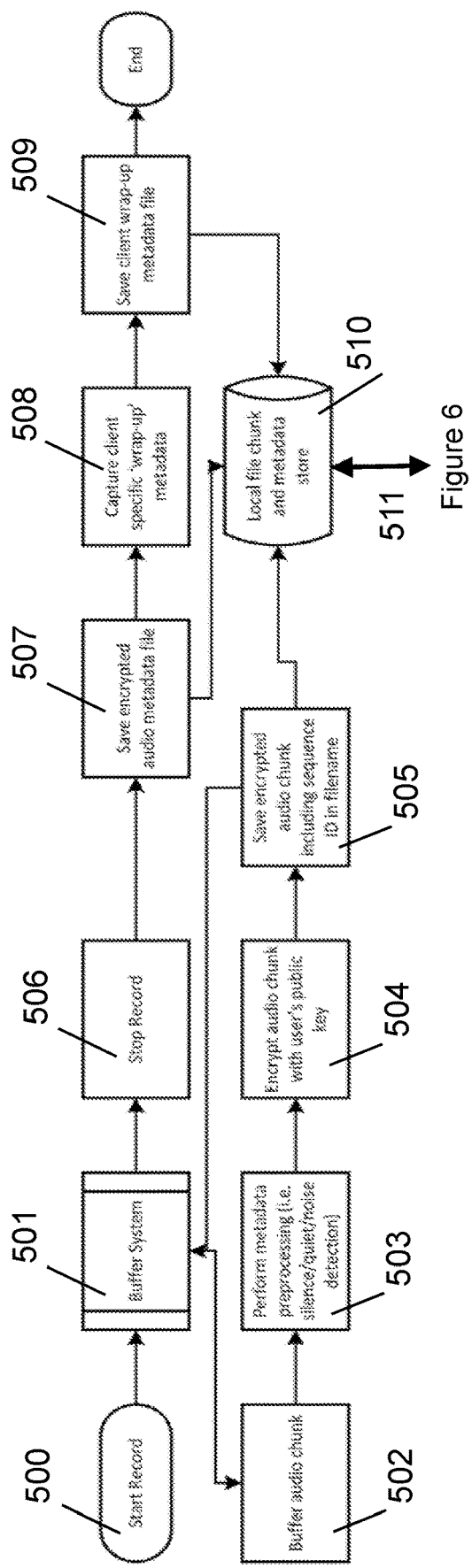
FIG. 5 shows an upload and storage workflow diagram of audio capture one the recording device side.
Figure 6:
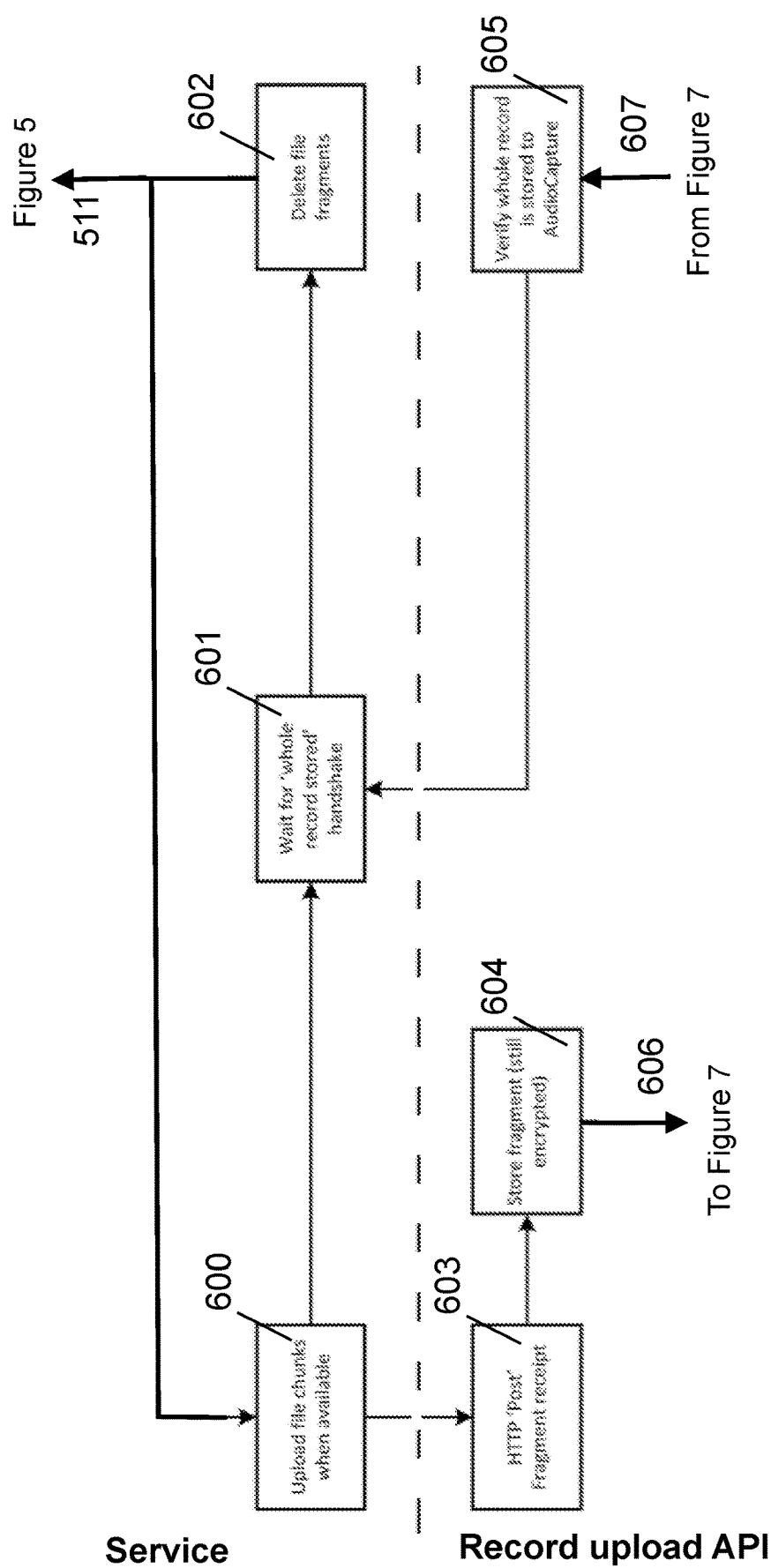
FIG. 6 shows an upload and storage workflow diagram within the background service (recording device) and record upload API (server).
Figure 7:
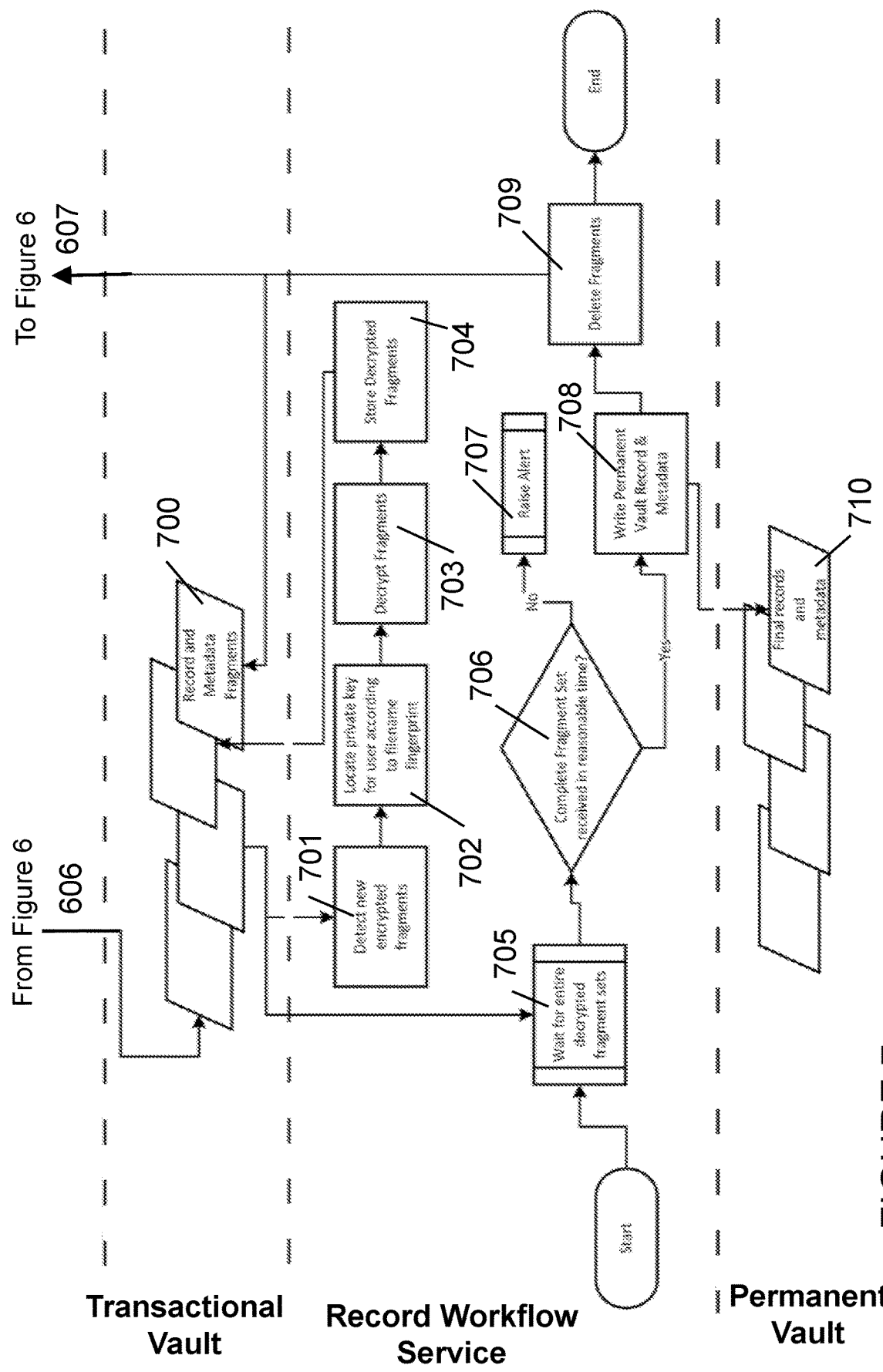
FIG. 7 shows an upload and storage workflow diagram on the server side.

FIGS. 5 to 7 show a high-level upload and storage workflow diagram of audio Capture including the server side components. The overall workflow can be described as follows:

Step 1: The client device buffers the streaming microphone audio in memory, as it is received;

Step 2: When a configurable amount of audio data has been received to the buffer, or if the recording session is completed, the audio (or other media) fragment may be compressed in-memory using a lossless or lossy compression algorithm (e.g. using a CODEC such as FLAC, MP3, OPUS, etc.)

Step 3: The buffered, and potentially compressed fragment is encrypted using the unique keys methods described elsewhere in this specification.

Step 4: When recording is completed, any audio or other media file header, required by the file-media type, such as a WAV header (which, although it comes at the start of the finally stored file, can only be generated at the end of the recording, as it contains the audio or file length), is then created as a '1st' fragment, and encrypted and stored in the same way.

Step 5: Whenever network connectivity to the server is available, a background service uploads any stored fragment and/or media file header.

Step 6: Then, either/or the following:
Step 6A: As the server acknowledges the receipt and successful server side side-storage of each individual fragment, to the client device, the client device deletes it's copy of the fragment, or
Step 6B: as the server acknowledges the receipt of all fragments and successful aggregation and generation of the entire media record, the client device only then deletes all of its fragments related to that media record. If the server has problems aggregating or storing the entire media record, it can request that the client device resends all or some of the fragments that appear to be missing or corrupt.

FIG. 5 is a high level diagram showing the processing steps performed locally on the client machine (or recording device) side. When the recording starts 500, the audio file buffered in memory 501 is chunked into small pieces 502 (representing for example 10 seconds of audio). Metadata pre-processing (i.e. silence/quiet/noise detection) is also performed 503. Each audio chunk is then encrypted based on a unique public/private key pair generated for each user by the server 504 and the encrypted audio chunks are saved with their sequence ID in their filename 505. The steps are repeated until the audio recording is stopped 506. The encrypted audio metadata files are saved locally 507. The client specific metadata is also captured 508 and saved locally as a wrap up metadata file 509. The encrypted audio chunks are stored alongside their wrap up metadata file 510, creating a queue of encrypted files 511.

As shown in FIG. 6, a background service checks for an Internet/network connection. Once an Internet connection is available 600 the individual fragments are sent off. An HTTP POST method is used to receive the fragments 603 and the encrypted fragments are then stored 604 and sent to a transactional vault 606.

As shown in FIG. 7, when new encrypted fragments are detected 701, the datacentre then uses the data uploaded along with the user's private key 702 to decrypt each fragment 703, checks it against the original checksum (in case of tampering or corruption), then aggregates the fragments back into a whole record of the authoritative recording (even though that recording never previously existed anywhere in its entirety), before storing the recording in a unique 'vault' 700 dedicated to the Client or User, as the authoritative record of the original recording.

The entire decrypted fragment sets are awaited for 705. If the complete fragment set has not been received in a reasonable time, an alert is raised 707; otherwise, the fragment set is stored on a permanent vault along with any associated metadata 709. An acknowledgement of receipt is then sent off to the client device 607 and the encrypted audio metadata files previously stored locally on the client machine may be deleted 602.

A number of methods for deleting the fragments from the client machine may be applied, such as:
1. Individual fragments are deleted as soon as they arrive when an acknowledgement is received that a fragment has been securely uploaded.
2. When the recording is securely stored in the vault, an acknowledgement of receipt is sent telling the client device that all of the fragments have been stored. All of the individual encrypted fragments saved on the client device are then deleted.
   a. If the client machine does not receive an acknowledgement within a predefined time period, it can start re-submitting fragments.
   b. If the server does not receive all the fragments it is expecting within a predefined time period, the next time the client machine gets in touch, the server will send a message telling the client machine which of the fragments are missing and asking for the missing fragments to be sent again.

For the case when the server has not received all of the fragments or if a fragment has been corrupted, a message is sent asking whether or not the most usable audio file may still be reconstructed without the missing fragment. (For example, someone might have tampered with a particular fragment, which can be detected because of an incorrect hash, however decrypting the fragment may be impossible). The same steps of process as described above may apply and the audio may still be reconstructed without the missing fragment.

Both the client and sever may also be given the ability to track:
   the session identifier;
   the state of the upload session;
   files that are believed to have been uploaded;
   any problems that occurred (i.e. fragments corrupted);
   the time when state changes occurred (in order to be able to timeout if necessary);
   details of any error associated with the current state;
   timestamp, number of previous retries if applicable and any information that may allow determine the next retry;
   the instance of aggregator that is or was aggregating the fragments in order to be able to share a workload;
   checksums for each fragment (this may be sent as an HTTP Header on each fragment upload request).

In some instances, the client may also need to take the server's view in preference to its own in such scenarios;

A user may have some visibility of the recording upload status on the client device side as well as on the server side. A number of options to provide some feedback on the recording status are available, such as:
   Audio Capture Desktop: Recent recordings may be displayed with their upload status (for example success, in-progress, error). This may be accessible through clicking on a specific menu, a pop up window, or as soon as a user opens a desktop recording application.
   Audio Capture iOS: An application may also display recent recordings with their upload status. Push notifications may also be available.
   Email: The user who made the recording may be notified by email or SMS on the status of their recording. An email may be sent when the recording has been aggregated, or if the recording has failed to upload with a specific error message, or if the recording has failed to upload after an unusually long period of time
   Portal: An upload status page may be available.

If configured as allowed to do so, a user may pause background uploading activities, for a configured maximum duration, to conserve network bandwidth (e.g. if cellular bandwidth is required for another user activity).

Another configuration option may allow for the device to only upload if connected to LAN or WiFi (i.e. to save on cellular data charges).

Another configuration option may allow for the device to only upload at specific date-times (e.g. to reserve bandwidth in a branch location for LOB software during branch opening hours).

Records may be any form of conversations between customer-facing staff and clients. These conversations may be, but not limited to:
   Face-to-face in the field.
   Face-to-face in branch.
   Conversation thru video conference.
   Conversation thru call centre.
   Conversation thru mobile.
   Records may also be questionnaire forms.

Audio metadata may describe a metadata file that contains:
   AGC (Automatic Gain Control) settings, so that potential AGC problems can be reproduced (emulated) and debugged;
   Timestamps for each block of audio data.

Analysis of this timing information may give a simple and very clear signal that the recording client has dropped data. Blocks of audio data may be streamed from the audio device and written to disk at regular intervals (for example every N ms). Any irregularity in this trace may show that data has been lost. The total amount of time taken (last time stamp minus first time stamp) should be equivalent to the amount of data in the audio file.

Example of metadata may contain any of the following:
   File type (wav, mp4, etc);
   Encoding (the value of the audio encoding parameter, when set, which may be the audio encoding (Audio CODEC) method used for an Audio record, or for the audio stream within a video record);
   Sample rate (for audio or video containing an audio track);
   Word size (the number of bits per bye—typically 8 or 16);
   Byte size of all fragments;
   Number of fragments;
   Recorded time;
   Start time;
   End time;
   User ID;
   Device ID;
   Audio Capture Version;
   Microphone used;
   Question pack ID;
   Question pack from engine;
   Number of channels (the number of tracks in an audio or video files);
   Record ID;
   Operating System Version;
   Model number;
   Tel recording topology;
   Tel recorder ref (any reference allocated to the audio recording by the call recorder itself);
   Tel system type;
   Tel system ref (any reference allocated to call 'being' the recording, by the telephone system itself;
   Telephone call direction;
   Tel number dialed;
   Tel number external;
   Tel device type;
   Api access software version;
   Api access software name;
Note
   It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

The invention claimed is:

1. A method of generating a secure record of a conversation, comprising the steps of:
 (a) recording the conversation using a recording device;
 (b) creating a section, chunk or other form of fragment of the conversation at the device;
 (c) uniquely encrypting that fragment, and also uniquely encrypting subsequent fragments, at the device, so that decryption of any single fragment does not result in the entire record of the conversation being decrypted;
 in which each encrypted fragment is sent to a remote server whilst the conversation is continuing and is also locally stored on the device whilst the conversation is continuing.

2. The method of claim 1 comprising the further steps of (a) retrieving from a remote secure server the conversation or a fragment of the conversation; (b) decrypting the conversation or fragment(s) and (c) an end-user determining if the decrypted conversation or fragment(s) are compliant with regulatory requirements or other laws.

3. The method of claim 1, (i) in which each encrypted fragment is sent to a remote server and is also locally stored on the device until such time as the device receives from the server a notification that a specific encrypted fragment has been successfully received and stored at the server, at which time the device deletes that locally stored encrypted fragment, or (ii) in which each encrypted fragment is sent to a remote server and is also locally stored on the device until such time as the device receives from the server a notification that all of the fragments making up the entire conversation have been successfully received and stored at the server, at which time the device deletes all of those locally stored encrypted fragments.

4. The method of claim 1 in which when the server identifies any fragments as missing or corrupt, then it requests the device to re-send these.

5. The method of claim 1, (i) in which each encrypted fragment is sent to a remote server continuously or intermittently whilst the conversation is continuing, or (ii) in which each encrypted fragment is sent to a remote server continuously or intermittently after the conversation is concluded.

6. The method of claim 1 in which the device
 (a) buffers in memory the output of a microphone that is recording the conversation
 (b) compresses using a lossy or lossless compression algorithm each section, chunk or other form of fragment of the conversation;
 (c) uniquely encrypts each fragment;
 (d) creates a header for the entire record of the conversation, the entire record being made up of a set of uniquely encrypted fragments;
 (e) uploads one or more encrypted fragments and/or the header if network connectivity is available.

7. The method of claim 1, (i) in which each fragment is automatically encrypted with a different encryption key; or (ii) in which a unique initialization vector and symmetric key are generated for each fragment, and the initialization vector and symmetric key are used to encrypt each fragment; or (iii) in which a hash is generated for the successive fragments as a checksum for the original unencrypted successive fragments; or (iv) in which the memory size of each fragment is chosen for efficient transmission over a network and for reducing the risk of fraud.

8. The method of claim 1, in which the server generates a unique user encryption key for the user/recording device pairing when the user first registers its device.

9. The method of claim 1, in which a unique initialization vector and symmetric key are generated for each fragment, and the initialization vector and symmetric key are used to encrypt each fragment, and in which the symmetric key is encrypted using the user encryption key and an RSA algorithm.

10. The method of claim 1, (i) in which the encrypted fragments are stored locally in the recording device creating a queue of encrypted files, or (ii) in which the encrypted fragments are stored alongside metadata containing details of each fragment, or (iii) in which the encrypted fragments are stored alongside metadata containing details of each fragment and in which metadata contains one or more of the following: time stamp, file type, number of fragments, start time, end time, AGC (Automatic Gain Control) settings, user ID, device ID.

11. The method of claim 1, (i) in which the fragments are transmitted to a remote server whenever a network/internet connection is established, or (ii) in which the fragments are transmitted to a remote server whenever a network/internet connection is established, and in which a background service on the device checks for network/internet availability and the presence of encrypted fragments.

12. The method of claim 1, in which the encrypted fragments are stored locally in the recording device creating a queue of encrypted files, and in which the queued fragments are transmitted to the remote server even if the recording is not complete.

13. The method of claim 1, (i) in which the encrypted fragments are stored alongside metadata containing details of each fragment, and in which the server receives the encrypted fragments alongside their metadata, decrypts them using their unique encryption key and stores them into a secure transactional vault, or (ii) in which the encrypted fragments are stored alongside metadata containing details of each fragment, and in which the server aggregates each fragments and their metadata into a unique conversation record and stores the unique conversation record into a unique permanent vault dedicated to the user, or (iii) in which the encrypted fragments are stored alongside metadata containing details of each fragment, and in which the server aggregates each fragments and their metadata into a unique conversation record and stores the unique conversation record into a unique permanent vault dedicated to the user, and in which the server waits for all the fragments to be received in a specific reasonable time before storing them into the permanent vault.

14. The method of claim 1, (i) in which an alert is raised on the recording device and/or on the server if all the fragments are not received within a specific time, or (ii) in which the server sends an acknowledgement receipt to the recording device that all the fragments are received, and the fragments are deleted on the recording device when the recording device receives the acknowledgement receipt, or (iii) in which the server sends an acknowledgment receipt to the recording device once a fragment is received, and the received fragment is deleted on the recording device when the recording device receives the acknowledgement receipt.

15. The method of claim 1, (i) in which the user of the recording device is able to track or get notification on the status of the conversation recording, or (ii) in which each encrypted fragment is sent to a remote server whilst the conversation is continuing and is also locally stored on the device whilst the conversation is continuing, and in which the server is able to track or get notification on the status of the conversation recording.

16. The method of claim 1, (i) in which the user is allowed to pause uploading activities for a configured maximum duration to conserve network bandwidth, or (ii) in which the recording device only sends the fragments to a remote server if connected to LAN or WiFi to avoid data charges over a cellular network, or (iii) in which the recording device only sends the fragments to a remote server at specific date and times.

17. The method of claim 1, (i) in which the conversation is immediately retrievable and accessible by an authorised end-user once it has been uploaded on a remote server, or (ii) in which AGC (Automatic Gain Control) data is captured at recording time in order to detect the status of a recording settings, so that potential AGC problems can be reproduced or emulated and debugged, or (iii) in which a server-side speech and language analytics engine processes the conversation recording, or (iv) in which a client or device-side speech and language analytics engine processes the conversation recording to, for example, detect silence, noise, reverberation, poor microphone positioning and uploads this as metadata to a remote server.

18. A system for generating a tamper-proof record of a conversation, the system comprising:
(a) a recording device including a first non-transitory storage medium, the recording device configured to record the conversation on the first non-transitory storage medium; the recording device further configured to, during or after the recording, continuously or intermittently send successive sections, chunks or other form of fragments of the audio recording to a secure remote server,
(b) a secure remote server configured to receive the successive fragments of the audio; and
(c) a secure vault including a second non-transitory storage medium, the secure vault configured to store the successive fragments of the audio on the second non-transitory storage medium; and
in which the recording device is configured such that each encrypted fragment is sent to the remote server whilst the conversation is continuing and is also locally stored on the first non-transitory storage medium whilst the conversation is continuing.

19. A recording device configured to generate a secure record of a conversation, wherein the recording device includes a non-transitory storage medium, the recording device being configured to:
(a) record the conversation;
(b) create a section, chunk or other form of fragment of the conversation at the device;
(c) uniquely encrypt that fragment, and also uniquely encrypt subsequent fragments, at the device, so that decryption of any single fragment does not result in the entire record of the conversation being decrypted; and
in which the recording device is configured such that each encrypted fragment is sent to a remote server whilst the conversation is continuing and is also locally stored on the non-transitory storage medium whilst the conversation is continuing.

\* \* \* \* \*